United States Patent
Sprik et al.

(10) Patent No.: US 9,719,548 B2
(45) Date of Patent: Aug. 1, 2017

(54) PRE-MOLDED SEAL CAP INSTALLATION TOOL

(71) Applicant: THE BOEING COMPANY, Chicago, IL (US)

(72) Inventors: Emily Anne Sprik, Springfield, PA (US); Matthew W. Benes, Harleysville, PA (US)

(73) Assignee: THE BOEING COMPANY, Chicago, IL (US)

( * ) Notice: Subject to any disclaimer, the term of this patent is extended or adjusted under 35 U.S.C. 154(b) by 226 days.

(21) Appl. No.: 14/600,088

(22) Filed: Jan. 20, 2015

(65) Prior Publication Data

US 2016/0207182 A1   Jul. 21, 2016

(51) Int. Cl.
*B23Q 1/44* (2006.01)
*F16B 37/14* (2006.01)
*F16B 33/00* (2006.01)
*B25B 11/00* (2006.01)

(52) U.S. Cl.
CPC ............ *F16B 37/14* (2013.01); *B25B 11/007* (2013.01); *F16B 33/004* (2013.01)

(58) Field of Classification Search
CPC ........... B23P 19/00; B23P 13/00; B23P 11/00; B23Q 1/36; B23Q 1/38; B23Q 3/00
See application file for complete search history.

(56) References Cited

U.S. PATENT DOCUMENTS

| | | | |
|---|---|---|---|
| 1,570,206 A | 1/1926 | Connell | |
| 4,377,956 A * | 3/1983 | Cooper | B25B 27/18 294/95 |
| 4,575,143 A | 3/1986 | Nast | |
| 4,589,648 A | 5/1986 | Hancock | |
| 5,106,139 A | 4/1992 | Palmer et al. | |
| 5,159,743 A * | 11/1992 | Somerville | B25B 27/026 29/252 |
| 5,265,887 A | 11/1993 | Stelmach | |
| 5,928,537 A | 7/1999 | Fortune | |
| 6,264,259 B1 | 7/2001 | Fortune | |
| 6,609,283 B1 * | 8/2003 | Somerville | B25B 27/023 29/255 |
| 6,874,833 B2 | 4/2005 | Keith et al. | |
| 7,010,840 B2 * | 3/2006 | Reale | B25B 27/062 29/255 |
| 7,669,306 B2 * | 3/2010 | Palka | B25B 27/02 29/255 |

(Continued)

*Primary Examiner* — Lee D Wilson
(74) *Attorney, Agent, or Firm* — Patterson + Sheridan, LLP

(57) ABSTRACT

Apparatus and method for applying pre-molded seal caps to fasteners. The apparatus includes an installation tool and a disposable cap holding fixture. The installation tool includes a body and a handle. A plunger can pass through the body and handle. A disposable cap holding fixture can be connected to an end of the body of the installation tool. The disposable cap holding fixture can grip a surface of a pre-molded seal cap. The pre-molded seal cap can then be placed on a fastener and the disposable cap holding fixture can be rotated to rotate the cap to cover the fastener with uncured sealant in the cap. The body and handle can be rotated by an operator or the body can rotate about the handle and actuation of the plunger can cause the body and the cap holding fixture to rotate. The plunger can then dislodge the cap from the fixture.

16 Claims, 5 Drawing Sheets

(56) References Cited

U.S. PATENT DOCUMENTS

| | | |
|---|---|---|
| 8,696,043 B2 | 4/2014 | Regan et al. |
| 8,931,153 B1 * | 1/2015 | Kimminau .............. B25B 13/48 29/255 |
| 2016/0207182 A1 * | 7/2016 | Sprik .................... F16B 33/004 |

* cited by examiner

PRE-MOLDED SEAL CAP INSTALLATION TOOL

This invention was made with Government support under N00019-12-C-2001 awarded by Department of Defense. The Government has certain rights in this invention.

BACKGROUND

Aspects disclosed herein relate to an installation tool for pre-molded seal caps.

SUMMARY

According to another aspect, an apparatus for applying pre-molded seal caps includes a body that defines a first aperture between the proximal end and a distal end of the body. The apparatus also includes a handle arranged at the proximal end of the body. The handle defines a second aperture that is substantially coaxial with the first aperture. The apparatus also includes a cap holding fixture attached to the distal end of the body. The cap holding fixture defines a third aperture between the proximal end of the cap holding fixture and a distal end of the cap holding fixture. The third aperture is substantially coaxial with the first and second apertures. The distal end of the cap holding fixture includes a socket adapted to grip a pre-molded seal cap. The apparatus also includes a plunger arranged in the first and second apertures. The plunger is movable between a first position and a second position. The plunger includes a proximal end that extends past the proximal end of the handle when the plunger is in the first position. The plunger includes a distal end that extends into a volume of the socket when the plunger is in the second position. The plunger includes an elongate shaft arranged in the first aperture. The elongate shaft includes at least one rifling channel on an outer surface. The first aperture of the body includes a tab extending toward the elongate shaft and engaging the rifling channel such that movement of the plunger between the first and second positions causes the body to rotate about the handle and the plunger. The plunger further comprises a button arranged on a proximal end of the elongate shaft. The button includes a slotted channel. The second aperture includes a tab extending into the slotted channel. The slotted channel and the tab prevent rotation of the button and elongate shaft relative to the handle. The apparatus also includes a bearing arranged between the handle and the body to enable the body and Holding fixture to rotate about the handle and the plunger. The apparatus also includes a spring arranged to bias the plunger in the first position.

According to one aspect, an apparatus for applying pre-molded seal caps include a body that defines a first aperture between the proximal end of the body and the distal end of the body. The body can include a first attachment feature at the distal end. The apparatus can also include a handle arranged at the proximal end of the body. The handle defines a second aperture that is substantially coaxial with the first aperture. The apparatus can also include a first replaceable cap holding fixture. The first replaceable cap holding fixture includes a second attachment feature adapted to meet with the first attachment feature to attach the first replaceable cap holding fixture to the body. The first replaceable cap holding fixture defines a third aperture between the proximal and the replaceable cap holding fixture and a distal end of the proximal cap holding fixture. The third aperture is substantially coaxial with the first and second apertures when the first replaceable cap holding fixture is attached to the body. The distal end of the first replaceable cap holding fixture includes a socket adapted to grip a first pre-molded seal cap. The apparatus also includes a plunger arranged in the first and second apertures. The plunger is movable between a first position and a second position. The plunger includes a proximal end that extends past the proximal end of the handle when the plunger is in the first position. The plunger includes a distal end that extends into a volume of the socket when the second attachment feature is mated to the first attachment feature and the plunger is in the second position.

According to another aspect, a disposable cap holding fixture for use with a pre-molded seal cap installation tool includes a body that has a proximal end and a distal end. The body includes a first attachment feature arranged at the proximal end and adapted to mate with an installation tool attachment feature. The body includes a cavity arranged at the distal end. Interior surfaces of the cavity include an inwardly curving profile. Interior surfaces of the cavity comprise a resilient material. An interior dimension of the cavity is selected based on a dimension of a pre-molded seal cap in order to adapt the cavity to receive the pre-molded seal cap. The body also includes an aperture between the proximal end and the distal end.

A method for applying a pre-molded seal cap to a fastener can include attaching a cap holding fixture to an installation tool, wherein the cap holding fixture includes a socket at a distal end. The method can also include pressing the socket of the cap holding fixture onto one pre-molded seal cap on a surface of a tray of a plurality of pre-molded seal caps, wherein the one pre-molded seal cap is held in the socket by friction with walls of the socket. The method can also include sliding the cap holding fixture in a direction parallel to the surface of the tray to remove the one pre-molded seal cap from the tray. The method can also include pressing the one pre-molded seal cap and the cap holding fixture down over a fastener. The method can also include rotating the cap holding fixture and pre-molded seal cap. The method can also include dislodging the pre-molded seal cap from the socket by extending a portion of the installation tool into the socket to push the pre-molded seal cap away from the socket. The method can also include removing the cap holding fixture from the pre-molded seal cap.

DETAILED DESCRIPTION

In the following, reference is made to aspects presented in this disclosure. However, the scope of the present disclosure is not limited to specific described aspects. Instead, any combination of the following features and elements, whether related to different embodiments or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figures 1A, 1B, 1C:
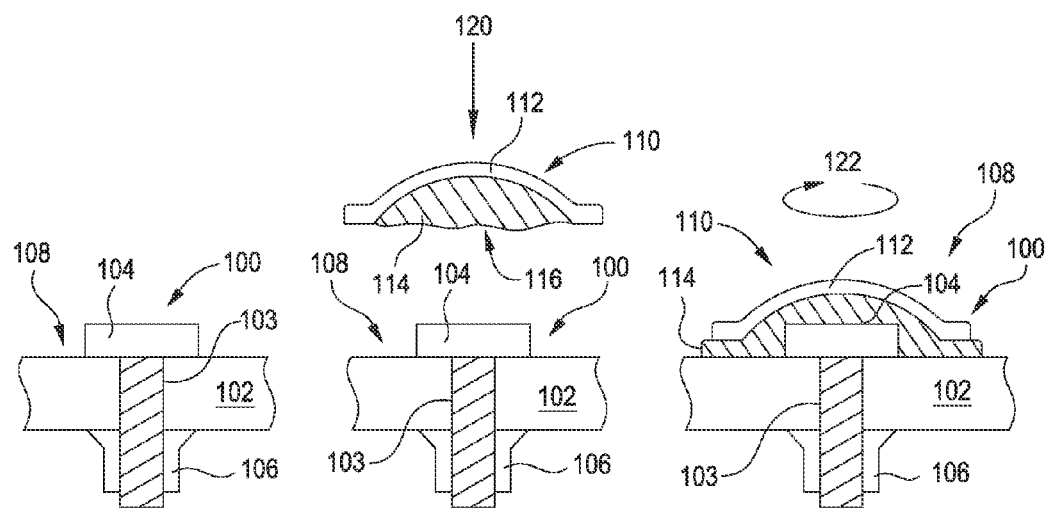
FIG. 1A is a partial cross-sectional view of a fastener fastening material.
FIG. 1B is a partial cross-sectional view of the fastener of FIG. 1A with a pre-molded seal cap positioned above the fastener.
FIG. 1C is a partial cross-sectional view of the fastener of FIG. 1A with the pre-molded seal cap arranged on the fastener.

Aircraft and other vehicles often use fasteners (e.g., bolts) to attach parts to each other. For example, FIG. 1A illustrates a portion of the vehicle 100 in which a fastener 104 and a bolt 106 are securing sheet metal 102. The fastener 104 and the bolt 106 may be attaching the sheet metal 102 to another piece of sheet metal, to a bracket, etc. For simplicity, FIGS. 1A-1C show sheet metal 102 and omit the other item being fastened.

In various applications, the fastener 104 may be exposed to the outside environment (as indicated by arrow 108). As a result, the fastener 104 may be exposed to oxygen, moisture, salt, and other substances that may cause the fastener 104 to corrode. Similarly, a hole 103 in the sheet metal 102 through which the fastener 104 passes may also be susceptible to such corrosion. In many instances, the fastener 104, the bolts 106, and/or the sheet metal 102 are made of dissimilar metals. For example, in an aircraft, the sheet metal 102 may be an aluminum alloy and the fastener 104 may be a titanium alloy or a steel alloy. When such dissimilar metals are in contact, they can be even more susceptible to corrosion.

To prevent corrosion, fasteners can be covered with a pre-molded seal cap 110 (shown in FIG. 1B). The pre-molded seal cap 110 can include a shell 112 that defines a cavity 116. The cavity 116 can be filled with an uncured sealant material 114 The pre-molded seal cap 110 can be placed over the exposed fastener 104 (by moving it in the direction of arrow 120). Referring to FIG. 1C, the pre-molded seal cap 110 is then rotated in the direction of arrow 122 (or in the opposite direction) to ensure that the sealant material 114 completely covers the surface of the fastener 104 and the sheet metal 102 proximate to the fastener 104. In various instances, the pre-molded seal cap 110 could be rotated at least 720°.

Figure 2:
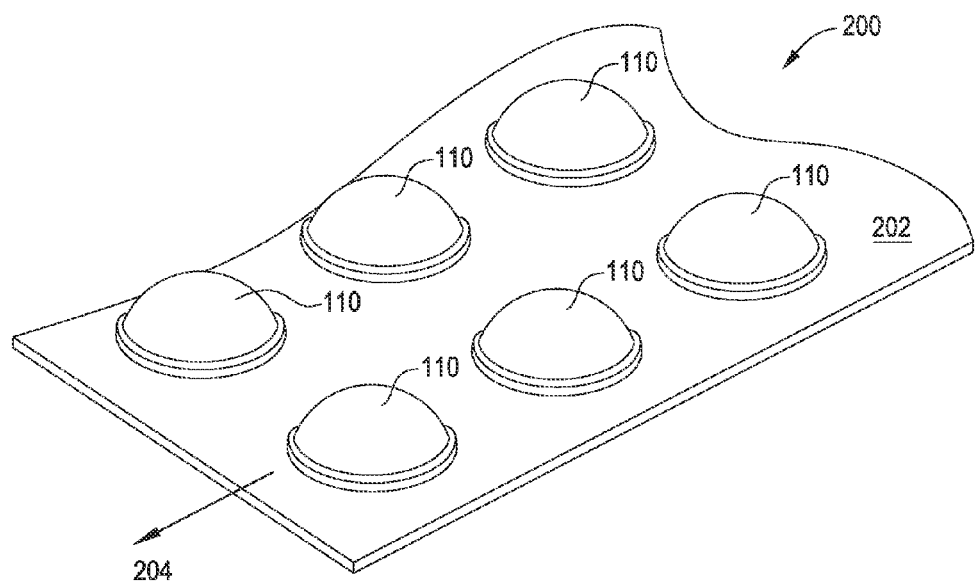
FIG. 2 is a perspective view of a tray with a plurality of pre-molded seal caps arranged thereon.

FIG. 2 illustrates package 200 of pre-molded seal caps. The package 200 includes a tray 202 and a plurality of pre-molded seal caps 110 arranged thereon. The package 200 may be stored at cold temperatures (e.g., −40° C.) until ready for use to prevent the sealant material from curing. When needed, the package 200 is removed from the cold storage. An operator then uses his fingers to slide each of the pre-molded seal caps 110 off of the tray 202 (e.g., in the direction of arrow 204). The pre-molded seal caps 110 should not be lifted off of the tray 202 because the uncured sealant material 114 may stick to the tray 202. After the worker has removed a pre-molded seal cap 110 from the tray 202, the worker places the pre-molded seal cap 110 on a fastener (as shown in FIG. 1B) and then rotates the pre-molded seal cap 110 (as shown in FIG. 1C). After the pre-molded seal caps 110 are installed on fasteners, the uncured sealant material 114 will eventually cure due to its exposure to air and humidity.

The above-described process of a worker using his hands to apply pre-molded seal caps 110 to fasteners 104 is problematic for several reasons. First, some of the uncured sealant material 114 is left behind on the tray 202 of the package 200 and/or is squeezed out from the space between the shell 112 of the pre-molded seal cap 110 and the fastener 104. As a result, operators usually wear gloves to handle the pre-molded seal caps 110, and the gloves are replaced frequently because they can quickly become covered in the sealant. Second, pre-molded seal caps 110 come in a wide variety of sizes to fit different sizes of fasteners 104. Some of the smaller pre-molded seal caps 110 can be difficult to manipulate with fingers, making it difficult for a worker to properly apply and rotate the pre-molded seal caps 110.

Figure 3:
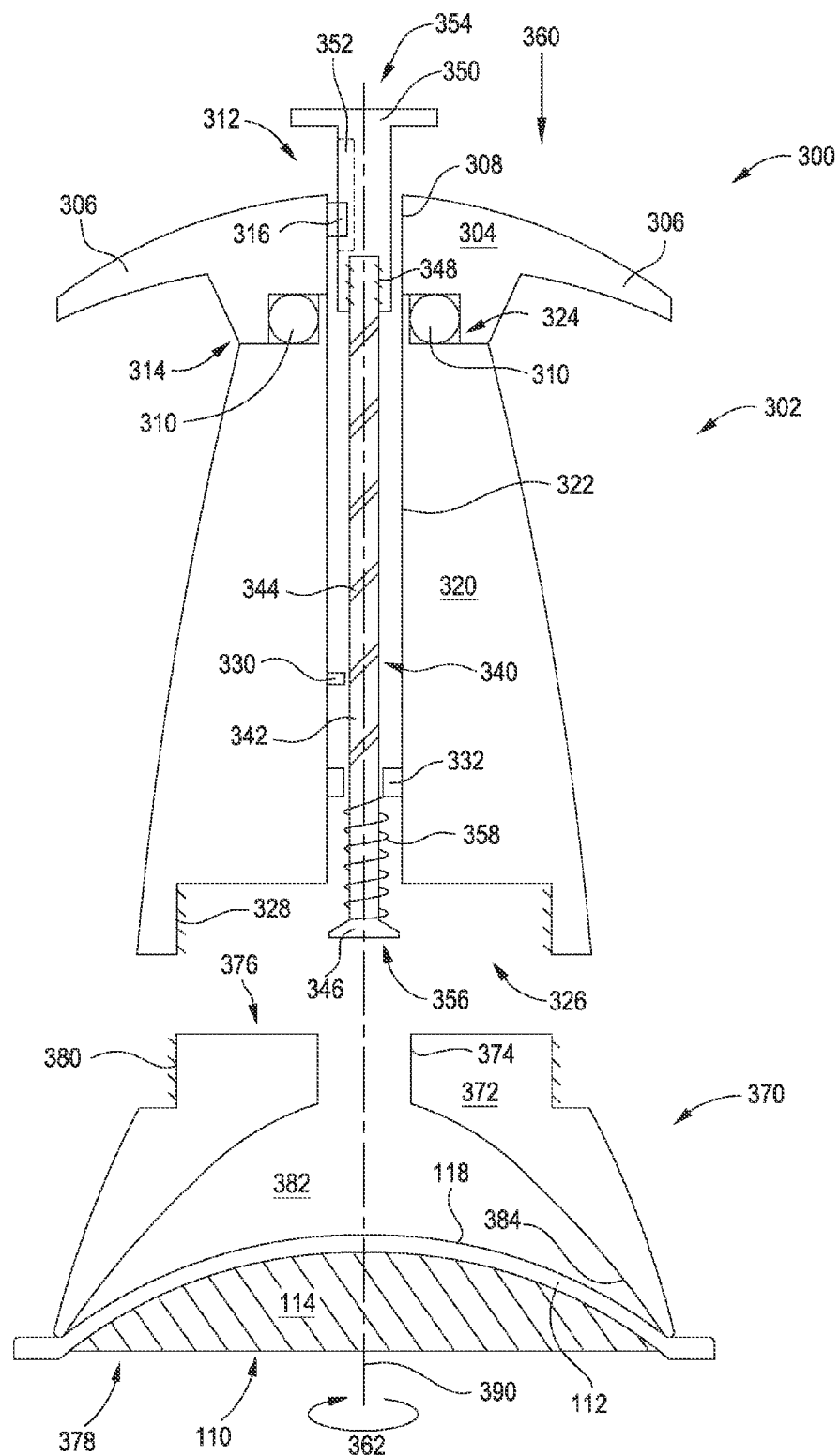
FIG. 3 is an exploded, partial cross-sectional view of an installation tool according to various embodiments.

FIG. 3 illustrates an apparatus 300 that can be used to remove pre-molded seal caps 110 from the tray 202 and install the pre-molded seal caps 110 on to fasteners. The apparatus 300 includes an installation tool 302 and a disposable cap holding fixture 370. The installation tool 302 includes a body 320 and a handle 304. The handle 304 includes finger grips 306. The handle 304 defines a proximal end 312 and a distal end 314. As used herein, "proximal end" refers to an end closest to a hand of the user and "distal end" refers to an end furthest from the hand of the user. The handle 304 includes an aperture 308 between the proximal end 312 and the distal end 314. The body 320 also defines a proximal end 324 and a distal end 326. The body 320 also includes an aperture 322 between the proximal end 324 and the distal end 326. The aperture 308 in the handle 304 and the aperture 322 in the body 320 are coaxial (e.g., coaxial about a longitudinal axis 390). The body 320 can rotate about the longitudinal axis 390 relative to the handle 304. To this end, the body 320 is coupled to the handle 304 by a bearing 310 arranged therebetween to enable relative rotation.

The installation tool 302 also includes a plunger 340 arranged in the apertures 308 and 322 in the handle 304 and the body 320, respectively. The plunger 340 includes a shaft 342 and a button 350. The button 350 is arranged at a proximal end 354 of the plunger 340. The button 350 engages the shaft 342 via threads 348. For example, the shaft 342 includes male threads that engage female threads on the button. Additionally or alternatively, the button 350 could engage the shaft 342 with adhesives, a press fit, or the like. The plunger 340 is provisioned with a biasing element which, when extended, urges the plunger 340 through the aperture 322 in a direction of the proximal end 354 of the plunger. Illustratively, the biasing element shown in FIG. 3 is a spiral spring 358 that forms a central opening having the shaft 342 slidably disposed there through. The spiral spring 358 is restrained at one end at an enlarged portion 346 at a distal end 356 of the shaft 342, and at the other end at a stopper 332. For example, the ends of the spiral spring 358 may be welded, glued, or otherwise adhered to the enlarged portion 346 at the distal end 356 of the shaft 342 and to the stopper 332. The stopper 332 is located in the aperture 322 of the body 320 and can be fixed in place relative to the body.

In one aspect, the plunger 340 does not rotate with the body 320. That is, the plunger 340 is stationary with respect to the handle 304. The button 350 can include a slotted channel 352. The aperture 308 in the handle 304 includes a tab 316 that extends into the slotted channel 352. The slotted channel 352 enables the button 350 (and the shaft 342) to move along the longitudinal axis 390 but prevents the button 350 (and the shaft 342) from rotating about the longitudinal axis 390 relative to the handle 304. In various instances, the button 350 can include more than one slotted channel 352 and the handle 304 can include more than one tab 316. For example, the slotted channels 352 and tabs 316 can be spaced apart about circumferences of the button 350 and the aperture 308, respectively. In such instances, each tab 316 can engage one of the slotted channels 352.

The shaft 342 of the plunger 340 includes a rifled channel 344 that extends around the circumference of the shaft 342 and along the longitudinal axis 390. The aperture 322 in the body 320 includes a tab 330 that extends into the rifled channel 344. When the button 350 is pressed (such that the plunger 340 moves along the longitudinal axis 390 in a direction toward the distal end 356 of the plunger 340), the rifled channel 344 causes the tab 330 and the body 320 to rotate about the longitudinal axis 390 (in the direction of arrow 362 or in the opposite direction) relative to the handle 304 and the plunger 340. In various instances, the shaft 342 can include more than one rifled channel 344 and the body 320 can include more than one tab 330. For example, there may be two rifled channels arranged 180° circumferentially apart. The aperture 322 can include two tabs that are arranged 180° apart as well. Each of the two tabs can engage one of the rifled channels.

The apparatus 300 also includes a disposable cap holding fixture 370 that can be removably attached to the installation tool 302. The distal end 326 of the body 320 of the installation tool 302 includes female threads 328. A proximal end 376 of the disposable cap holding fixture 370 includes a male thread 380 that can engage the female threads 328 on the body 320 of the installation tool 302. For example, the male threads 380 of the disposable cap holding fixture 370 can be aligned with the female threads 328 of the body 320, and the disposable cap holding fixture 370 can then be rotated (in the direction of arrow 362 or the opposite direction) relative to the body 320 such that the female threads 328 and the male threads 380 engage. When the female threads 328 and the male threads 380 are engaged, rotation of the body 320 (described above) is transmitted to the disposable cap holding fixture 370. In various instances, it may be preferable for the body 320 to rotate (as described above) in a direction that is opposite to the direction that the disposable cap holding fixture 370 is rotated to engage the threads. For example, if the disposable cap holding fixture 370 is rotated in a clockwise direction to engage the female threads 328 and the male threads 380, then it may be preferable for the body 320 to be rotated in a counterclockwise direction by the rifling channel 344 on the plunger 340. Such an arrangement can keep the female threads 328 and the male threads 380 tightly engaged when the body 320 is rotated by the plunger 340.

A distal end 378 of the disposable cap holding fixture 370 defines a socket 382 configured to grip a pre-molded seal cap 110. The socket 382 includes curved walls 384 that can interact with a surface 118 of the pre-molded seal cap 110. In various instances, at least the curved walls 384 of the socket 382 of the disposable cap holding fixture 370 can be made of a resilient material (e.g., plastic or acrylic) that can flex. The dimensions of the socket 382 can be smaller than a dimension of the surface 118 of the pre-molded seal cap 110 such that when the socket 382 is placed over the pre-molded seal cap 110, the curved walls 384 flex outwardly. Such flexing can provide a friction fit between the curved walls 384 and the surface 118 of the pre-molded seal cap 110. Additionally, in various instances, such flexing of the curved walls 384 creates a partial vacuum in the socket 382 that results in a suction force being applied to the pre-molded seal cap 110. As discussed above, pre-molded seal caps come in a variety of sizes. Different disposable cap holding fixtures 370 can be provided for different sizes of pre-molded seal caps, wherein the dimensions of the socket 382 for a particular disposable cap holding fixture can be sized to a particular size of pre-molded seal cap. In various instances, a particular disposable cap holding fixture 370 can include a socket 382 that is suitable for a range of sizes of pre-molded seal caps. For example, the disposable cap holding fixture 370 illustrated in FIG. 3 may also be able to grip pre-molded seal caps that are larger than the pre-molded seal cap 110 shown in FIG. 3. For example, with a pre-molded seal cap that is larger than the pre-molded seal cap 110 illustrated in FIG. 3, the curved walls 384 of the socket 382 may flex further outward. The curvature of the curved walls 384 may enable greater contact between the curved walls 384 and the surfaces of a variety of sizes of pre-molded seal caps. The disposable cap holding fixture 370 also includes an aperture 374 from the proximal end 376 into the socket 382. As described in greater detail below, the enlarged portion 346 at the distal end 356 of the plunger 340 can pass through the aperture 374.

In various instances, the package 200 (shown in FIG. 2) may include a suitably-sized disposable cap holding fixture 370 with the tray 202 and the pre-molded seal caps 110 thereon.

Figure 5A:
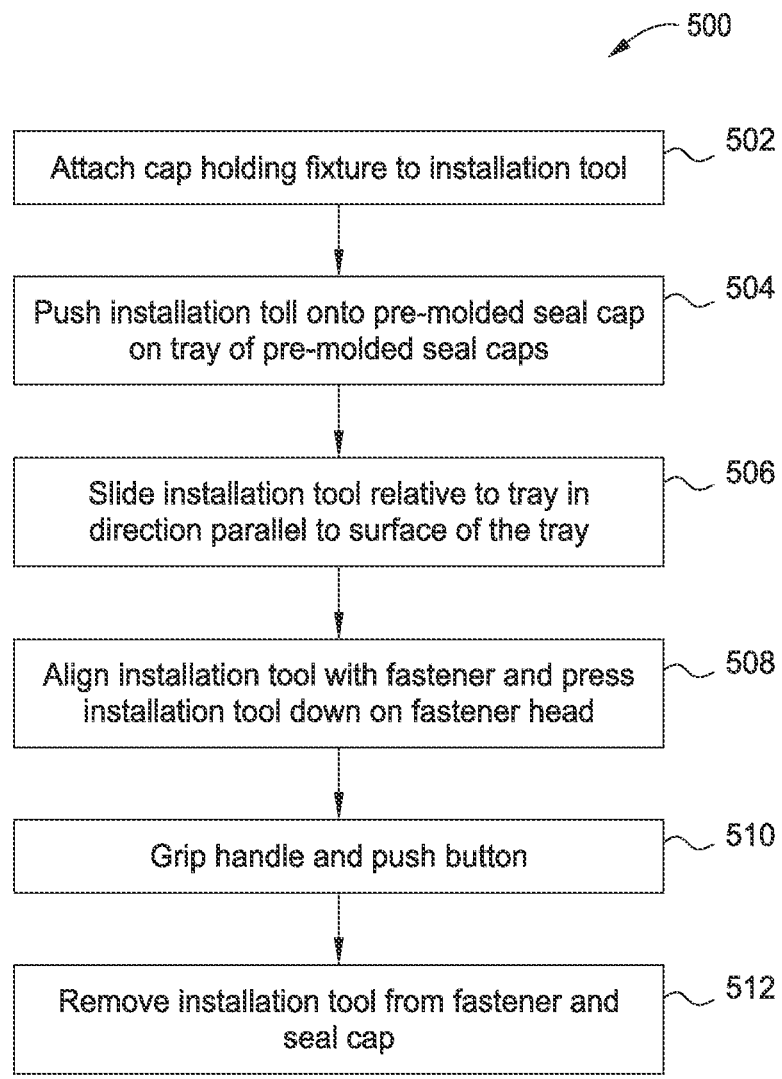
FIG. 5A is a block diagram for aspects of a method for using the installation tool of FIG. 3.

Referring to FIG. 5A, in use 500, an operator selects a disposable cap holding fixture 370 having a suitable size for the pre-molded seal caps the operator is about to use. The operator then attaches the disposable cap holding fixture 370 to the distal end 326 of the body 320 of the installation tool 302 (block 502), as discussed above. Referring again to FIG. 2, the operator then places the assembled apparatus 300 over a pre-molded seal cap 110 on the tray 202, pressing the socket 382 down over the pre-molded seal cap 110 (block 504). The operator then pushes the apparatus 300 in the direction of arrow 204 (in FIG. 2), parallel to the surface of the tray 202 to slide the pre-molded seal cap 110 off of the tray 202 (block 506). As discussed above, a friction fit between curved walls 384 of the socket 382 and a surface 118 of the pre-molded seal cap 110 can secure the pre-molded seal cap 110 in the socket 382. The operator then places the apparatus 300 over a fastener (e.g., fastener 104 depicted in FIGS. 1A-1C) and presses the apparatus 300 (with the pre-molded seal cap 110) down over the fastener (block 508). Once the pre-molded seal cap 110 in the socket 382 is placed over the fastener 104, the operator grips the finger grips 306 of the handle 304 with his fingers and press the button 350 (in the direction of arrow 360) (block 510). As discussed above, the button 350 and plunger 340 will move along the longitudinal axis 390 in the direction of arrow 360, which causes the body 320 and the disposable cap holding fixture 370 to rotate in the direction of arrow 362 (or in the opposite direction). As discussed above, rotating the pre-molded seal cap 110 about the fastener causes the uncured sealant material 114 to completely cover the fastener. In various instances, moving the button 350 and plunger 340 in the direction of arrow 360 causes the body 320 to rotate about the longitudinal axis 390 by approximately 720°, thereby rotating the pre-molded seal cap 110 on the fastener. As the plunger 340 reaches the distal end of its range of travel, the enlarged portion 346 at the distal end 356 of the plunger 340 passes through the aperture 374 in the disposable cap holding fixture 370 and contacts the surface 118 of the pre-molded seal cap 110, thereby dislodging the pre-molded seal cap 110 from the socket 382. The operator then lifts the apparatus 300 away from the pre-molded seal cap 110, which remains on the fastener (block 512). The above-described operation can be repeated for additional pre-molded seal caps. When the disposable cap holding fixture 370 becomes excessively soiled with uncured sealant material or when the operator begins using a different size of pre-molded seal caps, the operator can remove the disposable cap holding fixture 370 from the body 320 and replace it with a clean one and/or one of a different size that is suitable for the different size of pre-molded seal caps.

Figure 4:
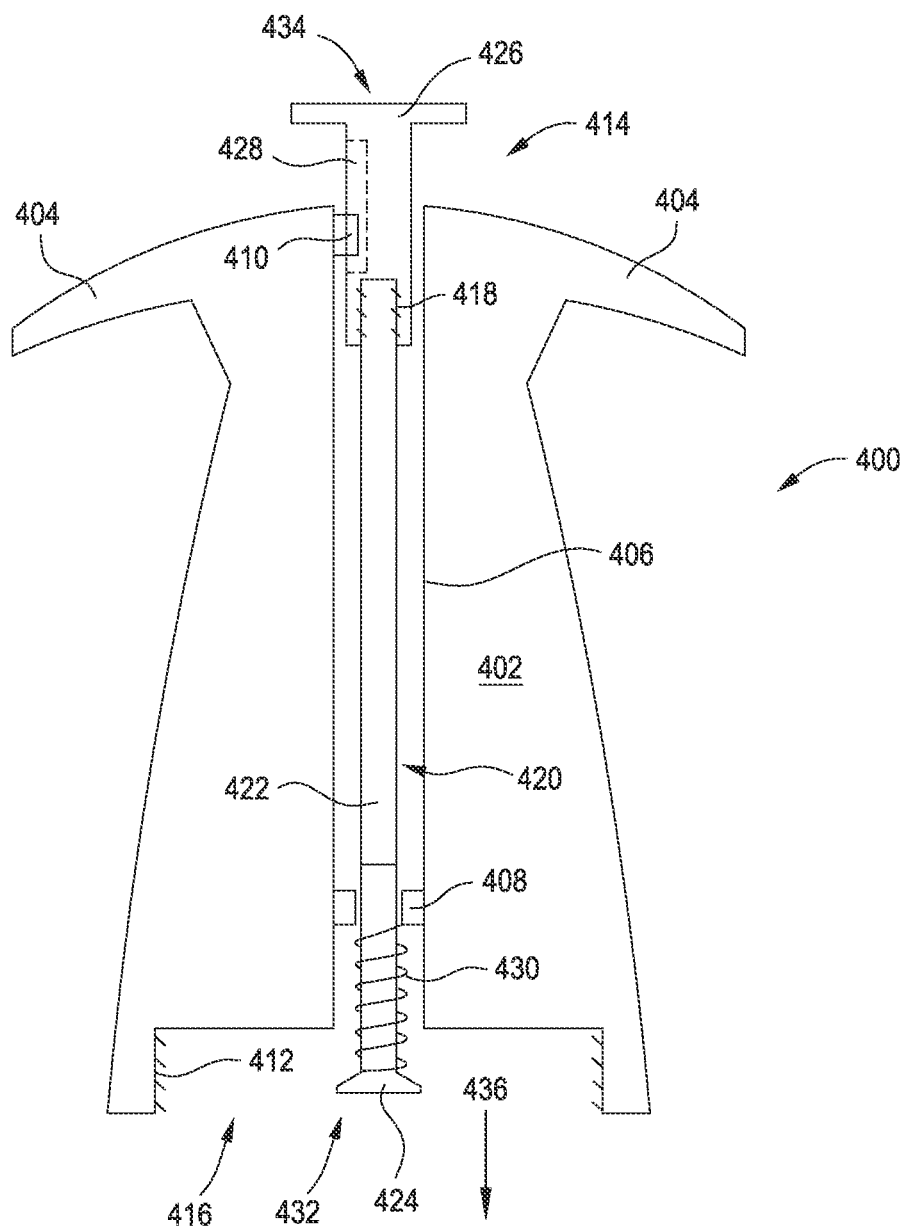
FIG. 4 is a partial cross-sectional view of an installation tool according to various other embodiments.

Referring now to FIG. 4, an alternative installation tool 400 is depicted. The body 402 and the handles 404 of the installation tool 400 are fixed relative to one another. For example, the body 402 in the handles 404 can be monolithic. The body 402 defines an aperture 406 from a proximal end 414 of the installation tool 400 to a distal end 416. A plunger 420 is arranged in the aperture 406. The plunger 420 includes a shaft 422 and a button 426 arranged at a proximal end 434 of the shaft 422. The button 426 is threadingly engaged with the shaft 422 via threads 418. The shaft 422 includes an enlarged portion 424 at its distal end 432. The button 426 includes a slotted channel 428, and the aperture 406 includes a tab 410 that extends into the slotted channel. The aperture 406 also includes a stopper 408, and a biasing element that is attached to the stopper 408 and the enlarged portion 424 of the shaft 422. FIG. 4 illustrates the biasing element as a spring 430, arranged similarly to the spiral spring 358 shown in FIG. 3. The plunger 420 can move through the aperture 406 in the direction of arrow 436. The spring 430 can bias the plunger 420 in a direction toward the proximal end 434 of the plunger 420.

Figure 5B:
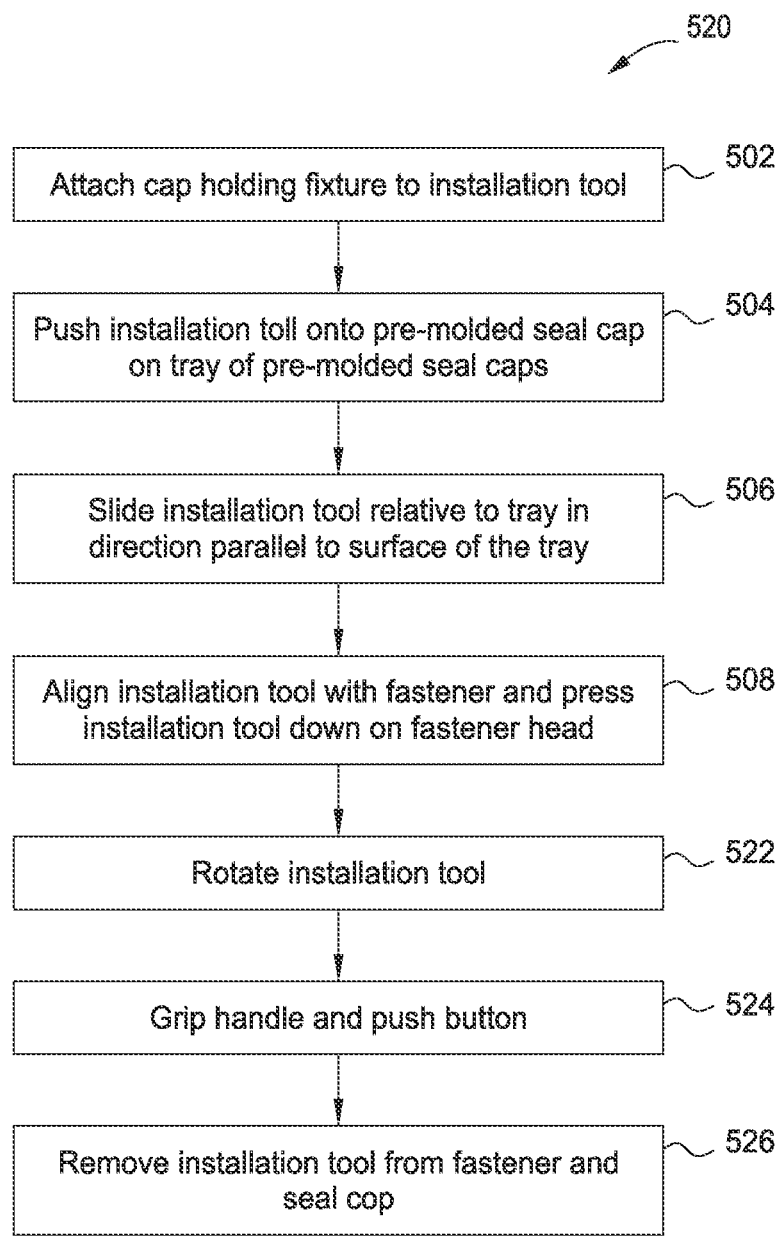
FIG. 5B is a block diagram for aspects of a method for using the installation tool of FIG. 4.

Referring to FIG. 5B, in use 520, an operator attaches a disposable cap holding fixture, such as disposable cap holding fixture 370, to the distal end 416 of the body 402 (block 502). As shown in FIG. 4, the distal end 416 of the body 402 includes female threads 412 that can engage with male threads 380 of the disposable cap holding fixture 370. Referring again to FIG. 2, the operator then places the installation tool 400 and disposable cap holding fixture 370 over a pre-molded seal cap 110 on the tray 202 and presses the socket 382 down over the pre-molded seal cap 110 (block 504). The operator then pushes the installation tool 400 and disposable cap holding fixture 370 in the direction of arrow 204 parallel to the tray 202 to slide the pre-molded seal cap 110 off of the tray 202 (block 506). As discussed above, a friction fit between curved walls 384 of the socket 382 and a surface 118 of the pre-molded seal cap 110 can secure the pre-molded seal cap 110 in the socket 382. The operator then places the installation tool 400 and disposable cap holding fixture 370 over a fastener (e.g., fastener 104 depicted in FIGS. 1A-1C) and presses the installation tool 400 (with the pre-molded seal cap) down over the fastener (block 508). The operator then rotates the installation tool 400 and the disposable cap holding fixture 370 by applying torque with his hand to the handles 404 to turn the pre-molded seal cap 110 on the fastener (block 522). After the operator rotates the installation tool 400 and the disposable cap holding fixture 370 (e.g., by approximately 720°), the operator pushes the button 426 in the direction of arrow 436 (block 524). As discussed above, pressing the button pushes the enlarged portion 424 of the plunger 420 into the surface 118 of the pre-molded seal cap 110, thereby dislodging the pre-molded seal cap 110 from the socket 382. The operator then removes the installation tool 400 and disposable cap holding fixture 370 from the pre-molded seal cap 110, which remains on the fastener (block 526). The above-described operation can be repeated for additional pre-molded seal caps.

The descriptions of the various aspects have been presented for purposes of illustration, but are not intended to be exhaustive or limited to the embodiments disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects of the present invention, other and further aspects of the invention may be devised without departing from the basic scope thereof, and the scope thereof is determined by the claims that follow.

What is claimed is:

1. An apparatus for applying pre-molded seal caps, the apparatus comprising:
    a body defining a first aperture between a proximal end and a distal end of the body;
    a handle arranged at the proximal end of the body, wherein the handle defines a second aperture that is substantially coaxial with the first aperture;
    a cap holding fixture attached to the distal end of the body, wherein the cap holding fixture defines a third aperture between a proximal end of the cap holding fixture and a distal end of the cap holding fixture, wherein the third aperture is substantially coaxial with the first and second apertures, and wherein the distal end of the cap holding fixture comprises a socket adapted to grip a pre-molded seal cap;
    a plunger arranged in the first and second apertures, wherein the plunger is movable between a first position and a second position, wherein the plunger includes a proximal end that extends past the proximal end of the handle when the plunger is in the first position and a distal end that extends into a volume of the socket when the plunger is in the second position, wherein the plunger includes an elongate shaft arranged in the first aperture, wherein the elongate shaft includes at least one rifling channel on an outer surface, wherein the first aperture of the body includes a tab extending toward the elongate shaft and engaging the rifling channel such that movement of the plunger between the first and second positions causes the body to rotate about the handle and the plunger, wherein the plunger further comprises a button arranged on a proximal end of the elongate shaft, wherein the button includes a slotted channel, wherein the second aperture includes a tab extending into the slotted channel, and wherein the slotted channel and the tab prevent rotation of the button and elongate shaft relative to the handle;
    a bearing arranged between the handle and the body to enable the body and cap holding fixture to rotate about the handle and the plunger; and
    a spring arranged to bias the plunger in the first position.

2. An apparatus for applying pre-molded seal caps, the apparatus comprising:
    a body defining a first aperture between a proximal end of the body and a distal end of the body, wherein the distal end includes a first attachment feature;
    a handle arranged at the proximal end of the body, wherein the handle defines a second aperture that is substantially coaxial with the first aperture;
    a first replaceable cap holding fixture, wherein a proximal end of the first replaceable cap holding fixture includes a second attachment feature adapted to mate with the first attachment feature to attach the first replaceable cap holding fixture to the body, wherein the first replaceable cap holding fixture defines a third aperture between the proximal end of the replaceable cap holding fixture and a distal end of the replaceable cap holding fixture, wherein the third aperture is substantially coaxial with the first and second apertures when the first replaceable cap holding fixture is attached to the body, and wherein the distal end of the first replaceable cap holding fixture comprises a socket adapted to grip a first pre-molded seal cap; and a plunger arranged in the first and second apertures, wherein the plunger is movable between a first position and a second position, wherein the plunger includes a proximal end that extends past the proximal end of the handle when the plunger is in the first position, and wherein the plunger includes a distal end that extends into a volume of the socket when the second attachment feature is mated to the first attachment feature and the plunger is in the second position.

3. The apparatus of claim 2, wherein the body and the replaceable cap holding fixture can rotate about the handle and the plunger.

4. The apparatus of claim 3, further comprising a bearing arranged between the handle and the body.

5. The apparatus of claim 3, wherein the plunger includes an elongate shaft arranged in the first aperture, wherein the elongate shaft includes at least one rifling channel on an outer surface, wherein the first aperture of the body includes a tab extending toward the elongate shaft and engaging the rifling channel such that movement of the plunger between the first and second positions causes the body to rotate about the handle and the plunger.

6. The apparatus of claim 5, further comprising a button arranged on a proximal end of the elongate shaft, wherein the button includes a slotted channel, wherein the second aperture includes a tab extending into the slotted channel, and wherein the slotted channel and the tab prevent rotation of the button and elongate shaft relative to the handle.

7. The apparatus of claim 5, wherein moving the plunger from the first position to the second position causes the body to rotate at least 720° about the handle and the plunger.

8. The apparatus of claim 2, further comprising a spring arranged to bias the plunger in the first position.

9. The apparatus of claim 2, wherein the socket comprises a resilient material, wherein the volume of the socket defines a dimension that is smaller than an exterior dimension of a pre-molded seal cap such that the resilient material is displaced outwardly when the pre-molded seal cap is inserted into the volume, and wherein the pre-molded seal cap is gripped by the resilient material.

10. The apparatus of claim 2, wherein the first attachment feature comprises female threads, wherein the second attachment feature comprises male threads, and wherein the male threads are configured to threadingly engage the female threads.

11. The apparatus of claim 2, further comprising a second replaceable cap holding fixture, wherein a proximal end of the second replaceable cap holding fixture includes a second attachment feature adapted to mate with the first attachment feature to attach the second replaceable cap holding fixture to the body, wherein the second replaceable cap holding fixture defines a fourth aperture between the proximal end of the replaceable cap holding fixture and the distal end of the replaceable cap holding fixture, wherein the fourth aperture is substantially coaxial with the first and second apertures when the second replaceable cap holding fixture is attached to the body, wherein the distal end of the second replaceable cap holding fixture comprises a socket adapted to grip a second pre-molded seal cap, and wherein the socket of the second replaceable cap holding fixture is a different size than the socket of the first replaceable cap holding fixture.

12. A method for applying a pre-molded seal cap to a fastener, comprising:

attaching a cap holding fixture to an installation tool, wherein the cap holding fixture includes a socket at a distal end;

pressing the socket of the cap holding fixture onto one pre-molded seal cap on a surface of a tray of a plurality of pre-molded seal caps, wherein the one pre-molded seal cap is held in the socket by friction with walls of the socket;

sliding the cap holding fixture in a direction parallel to the surface of the tray to remove the one pre-molded seal cap from the tray;

pressing the one pre-molded seal cap and the cap holding fixture down over a fastener;

rotating the cap holding fixture and pre-molded seal cap;

dislodging the pre-molded seal cap from the socket by extending a portion of the installation tool into the socket to push the pre-molded seal cap away from the socket; and removing the cap holding fixture from the pre-molded seal cap.

13. The method of claim 12, wherein rotating the cap holding fixture and dislodging the pre-molded seal cap comprise depressing a button on the installation tool, wherein pressing the button causes the cap holding fixture to rotate about the installation tool, wherein the portion of the installation tool that extends into the socket comprises a shaft running through the installation tool, and wherein a distal end of the shaft presses on the pre-molded seal cap to dislodge the pre-molded seal cap when the button is depressed.

14. The apparatus of claim 1, wherein movement of the plunger from the first position to the second position causes the body to rotate at least 720° about the handle and the plunger.

15. The apparatus of claim 1, wherein the socket comprises a resilient material, wherein the volume of the socket defines a dimension that is smaller than an exterior dimension of a pre-molded seal cap such that the resilient material is displaced outwardly when the pre-molded seal cap is inserted into the volume, and wherein the pre-molded seal cap is gripped by the resilient material.

16. The apparatus of claim 1, wherein the cap holding fixture is detachable from the distal end of the body, the apparatus further comprising a second cap holding fixture configured for attachment to the distal end of the body, wherein the second cap holding fixture defines another third aperture between a proximal end of the second cap holding fixture and a distal end of the second cap holding fixture, wherein the another third aperture is substantially coaxial with the first and second apertures when the second cap holding fixture is attached to the distal end of the body, wherein the distal end of the second cap holding fixture comprises a second socket adapted to grip a second pre-molded seal cap that includes different dimensions from the pre-molded seal cap.

* * * * *